United States Patent [19]
Pfeiffer et al.

[11] Patent Number: 5,195,149
[45] Date of Patent: Mar. 16, 1993

[54] FIBER OPTIC AMPLIFIER

[75] Inventors: Thomas Pfeiffer, Stuttgart; Rolf Rossberg, Schwieberdingen; Henning Bülow, Leonberg, all of Fed. Rep. of Germany

[73] Assignee: Alcatel N.V., Amsterdam, Netherlands

[21] Appl. No.: 835,291

[22] Filed: Feb. 13, 1992

[30] Foreign Application Priority Data

Feb. 13, 1991 [DE] Fed. Rep. of Germany ....... 4104268

[51] Int. Cl.⁵ .............................................. G02B 6/26
[52] U.S. Cl. .................................... 385/28; 359/341; 372/6
[58] Field of Search ...................... 385/27, 28, 43, 95; 372/6, 7; 359/341

[56] References Cited

U.S. PATENT DOCUMENTS

| | | | |
|---|---|---|---|
| 4,863,230 | 9/1989 | Webb | 385/27 |
| 4,938,556 | 7/1990 | Digonnet et al. | 385/27 X |
| 4,963,832 | 10/1990 | Desurvire et al. | 385/30 |
| 5,048,026 | 9/1991 | Shaw et al. | 385/27 X |
| 5,067,789 | 11/1991 | Hall et al. | 385/27 |

FOREIGN PATENT DOCUMENTS 0425014  5/1991  European Pat. Off.

OTHER PUBLICATIONS

"5 Gbit/s Transmission Over 146 KM Using Erbium-Doped Fibre Amplifier", B. Wedding et al, ECOC '89, Fifteenth European Conference on Optical Communication, Gothenburg, Sweden, Sep. 10-14, 1989, Regular Papers TuA5-7, vol. 1, pp. 86-89.

Electronic Letters, vol. 22, No. 6, Mar. 13, 1986, pp. 318-319 "Low-Loss Joints Between Dissimilar Fibres by Tapering Fusion Splices" D. B. Mortimore, J. V. Wright.

*Primary Examiner*—Frank Gonzalez
*Attorney, Agent, or Firm*—Ware, Fressola, Van Der Sluys & Adolphson

[57] ABSTRACT

To increase the pump efficiency in a fiber-optic amplifier, the pump coupler (2) is fabricated from a fiber whose mode field diameter for the pump light is adapted to the mode field diameter of the active length of fiber (7).

In an alternative solution, the arm of the pump coupler (2) coupled to the pump source (1) on the one hand and connected to the active length of fiber (7) on the other hand consists of a fiber adapted to the mode field diameter of the active length of fiber (7), and the arm of the pump coupler (2) serving as a connection to the incoming transmission line (8) consists of a fiber corresponding to the optical waveguide of the transmission line (8).

9 Claims, 1 Drawing Sheet

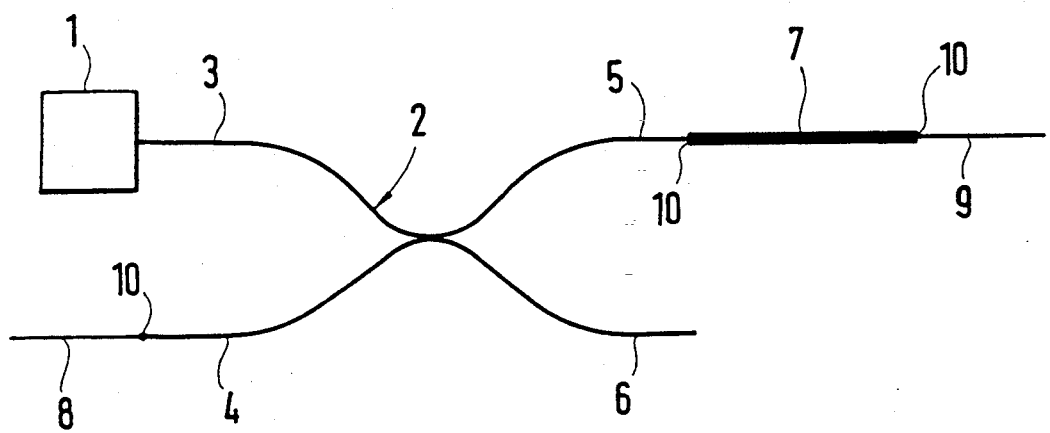

FIBER OPTIC AMPLIFIER

TECHNICAL FIELD

The present invention relates to a fiber-optic amplifier.

BACKGROUND OF THE INVENTION

A fiber-optic amplifier of this type is known from the print publication "ECOC '89", Fifteenth European Conference on Optical Communication, Sep. 10-14, 1989, Gothenburg, Sweden, Proceedings, Vol. 1, Regular Papers TuA 5-7, pages 86-89. In this amplifier, the light radiated by a pump source and the light arriving from the signal light of the transmission line are combined in a pump coupler and are jointly transferred to an active length of fiber. However, the active length of fiber usually shows mode field diameters different from those of the pump coupler and the standardized optical waveguides of the incoming and outgoing transmission lines. For this reason, attenuation losses arise at the splices between the different optical waveguides, for both the pump light and the signal light.

SUMMARY OF THE INVENTION

The term "standardized optical waveguides" is used here to designate single-mode fibers, such as are conventionally used in optical systems of public communications engineering.

The invention is based on the task of creating a fiber-optic amplifier with improved efficiency. This problem is solved according to the invention by a fiber-optic amplifier consisting of a multiport pump coupler, a pump source connected to a first port of the pump coupler, and a doped length of fiber connected to another port of the pump coupler, the free end of the doped length of fiber and a further port of the pump coupler serving to connect the latter to optical transmission lines formed by standard optical waveguides, wherein the pump coupler is fabricated from a fiber whose mode field diameter for the pump light is adapted to the mode field diameter of the doped length of fiber. A further solution of the problem underlying the invention is a fiber-optic amplifier consisting of a multiport pump coupler, a pump source connected to a first port of the pump coupler, and a doped length of fiber connected to another port of the pump coupler, the free end of the doped length of fiber and a further port of the pump coupler serving to connect the latter to optical transmission lines formed by standard optical waveguides, wherein the arm of the pump coupler connected, on the one hand, to the pump source and, on the other hand, to the doped length of fiber, is formed by a fiber whose mode field diameter is adjusted to that of the doped length of fiber, and that the arm of the pump coupler serving to connect the incoming transmission line is formed by a fiber having a inner cladding region whose refractive index is adjusted to that of the outer cladding region of the fiber, the other optical properties of the latter being the same as those of the optical waveguide of the transmission line.

BRIEF DESCRIPTION OF THE DRAWING

The invention will be explained in greater detail below with reference to an embodiment of the fiber-optic amplifier shown schematically in a drawing.

BEST MODE FOR CARRYING OUT THE INVENTION

As shown in the single drawings, the fiber-optic amplifier consists of a pump source 1, a pump coupler 2 with four ports 3-6 and an active length of fiber 7. The first port 3 of the pump coupler 2 is connected to the pump source 1, the second port 4 is connected to the optical waveguide of an incoming transmission line 8, and the third port 5 is connected to one end of the active length of fiber 7, whose further-going other connection end is connected to the optical waveguide of an outgoing transmission line 9. The fourth port 6 of the pump coupler 2 remains free in this case.

In the fiber-optic amplifier, whose length of fiber 7 is doped, for example, with erbium or neodymium, the active ions are excited by means of the pump source 1 in order to subsequently amplify the light waves of the signal light conducted by the incoming transmission line 8. To reduce the losses of the amplifier, which originate primarily because of the different mode field diameters between the active length of fiber 7 and the pump coupler 2 and the standardized optical waveguides of the incoming and outgoing transmission lines 8, 9 at the corresponding splices 10, the pump coupler 2 is fabricated from a fiber whose mode field diameter for the pump light is adjusted to the mode field diameter of the doped, active length of fiber 7. The smallest splice losses in this case are achieved by the fact that an undoped fiber or a fiber corresponding to the doped length of fiber 7 without doping is used. In this case, the losses resulting from a misadaptation of the mode field diameters are reduced to the splices 10 between the incoming transmission line 8 and the pigtail 4 of the pump coupler 2 on the one hand and to the splice 10 between the doped, active length of fiber 7 and the outgoing transmission line 9. Assuming that the coupler end of the first port 3 is coupled directly to the pump source 1, only the signal light is affected by the misadaptation of the mode field diameters in this solution. This misadaptation can, however, be reduced by means of a taper splice.

In an alternative solution, the loss of signal light at the splices 10 between the incoming transmission line 8 and the pump coupler 2 is reduced by the fact that the pump coupler 2 is fabricated from two different fibers. In this case, the pump arm extending between the first and third ports 3, 5 consists of a fiber whose mode field diameter for the pump light is adapted to the mode field diameter of the doped length of fiber 7. The signal arm of the pump coupler extending between the second and fourth ports 4, 6, on the other hand, consists of a fiber with an internal cladding region, whose refractive index is adapted to the refractive index of the outer cladding region (matched cladding) and which otherwise shows the same optical properties as the optical waveguide of the transmission line 8. Its fiber can, however, also show, for example, an inner optical cladding with a refractive index that is smaller than the refractive index of the outer fiber cladding (depressed cladding). The splice attenuation between the transmission line 8 consisting of a fiber of this type and the fiber used for the corresponding signal arm of the pump coupler 2 is, however, negligibly small.

If a coupler is fabricated from different fibers, the light will not couple over completely from the one fiber to subsequent other. In this way, part of the signal or pump light is lost for the amplification. A complete coupling-over of the light is possible only when the propagation constants B in each fiber are identical in the region of the coupling zone. The propagation constants can be adapted to each other, for example, by tapering one of the fibers before fusion and drawing to the coupler. Another possibility consists of the fact that, in one of the fibers, the cladding is removed completely or in part before drawing of the coupler by etching. In order to reduce the losses resulting from the misadaptation of the mode field diameters that is still present, the splice 10 is tapered between the doped length of fiber 7 and the optical waveguide of the outgoing transmission line 9. Taper splices can be produced both by drawing and reduction of the outside diameter of the fibers and also by means of core tapers, in which the adaptation of the mode field diameters is carried out by means of a heat source essentially affecting only the fiber cores.

We claim:

1. Fiber-optic amplifier comprising a multiport pump coupler (2), a pump source (1) connected to a first port (3) of the pump coupler, and a doped length of fiber (7) connected to a second port (5) of the pump coupler, a free end of the doped length of fiber and a third port (4) of the pump coupler serving to connect the coupler to optical transmission lines (9, 8) formed of standard optical fibers, characterized in that, at least between the first and second ports (3, 5), the pump coupler (2) is fabricated from a fiber whose mode field diameter for the pump light is adjusted to be substantially equal to the mode field diameter of the doped length of fiber (7).

2. A fiber-optic amplifier as claimed in claim 1, characterized in that, at least between the first and second ports (3, 5), the fiber is undoped.

3. A fiber-optic amplifier as claimed in claim 1, characterized in that a splice (10) between the optical waveguide of the incoming transmission line (8) and a pigtail of the third port (4) of the pump coupler (2) and a splice (10) between the free end of the doped length of fiber (7) and the optical waveguide of the outgoing transmission line (9) are tapered.

4. Fiber-optic amplifier consisting of a muiltiport pump coupler (2), a pump source (1) connected to a first port (3) of the pump coupler, and a doped length of fiber (7) connected at one end to a port (5) of the pump coupler, an opposite end of the doped length of fiber and a third port (4) of the pump coupler serving to connect the coupler to optical transmission lines (9, 8) formed by standard optical fibers, characterized in that a first arm of the pump coupler (2) connected, on the one hand, at the first port (3) to the pump source (1) and, on the other hand, at the second port (5) to the doped length of fiber (7), is formed by a first fiber whose mode field diameter is adjusted to be substantially equal to the mode field diameter of the doped length of fiber (7), and that a second arm of the pump coupler (2) serving to connect the transmission line (8) at the third port (4) is formed by a second fiber having an inner cladding region whose refractive index is adjusted to that of the outer cladding region of the second fiber, the other optical properties of the second fiber being the same as those of the optical fiber of the transmission line (8).

5. A fiber-optic amplifier as claimed in claim 4, characterized in that before the first and second fibers are fused and drawn to form the coupler, one of them is treated in such a way that the propagation constants in the two fibers are equal in the interaction region.

6. A fiber-optic amplifier as claimed in claim 4, characterized in that a splice (10) between the doped length of fiber (7) and the optical fiber of the outgoing transmission line (9) is tapered.

7. A fiber-optic amplifier, comprising:
a coupler (2) having a first fiber fused to a second fiber, the coupler having a first port (3) and a second port (5) at respective ends of the first fiber, the coupler also having a third port (4) at an end of the second fiber;
a pump source (1) connected to the first port (3) of the coupler for providing pump light;
a transmission line (8) connected to the third port (4) of the coupler for providing an incoming transmitted signal;
a doped length of fiber (7) connected at a first end thereof to the second part (5) of the coupler; and
a transmission line (9) connected to a second end of the doped fiber (7);
wherein the field diameter of the first fiber for the pump light is adjusted to be substantially equal to the mode field diameter of the doped length of fiber (7).

8. The fiber-optic amplifier of claim 7, wherein the first fiber is undoped.

9. The fiber-optic amplifier of claim 7, wherein a pair of splices (10) between the transmission line (8) and the third port (4) and between the second end of the doped fiber (7) and the transmission line (9) are tapered.

* * * * *

UNITED STATES PATENT AND TRADEMARK OFFICE
CERTIFICATE OF CORRECTION

PATENT NO. : 5,195,149

DATED : March 16, 1993

INVENTOR(S) : Pfeiffer et al

It is certified that error appears in the above-identified patent and that said Letters Patent is hereby corrected as shown below:

At column 4, line 36, please change "part" to --port--.

Signed and Sealed this

Thirtieth Day of November, 1993

Attest:

BRUCE LEHMAN

*Attesting Officer*  *Commissioner of Patents and Trademarks*